United States Patent Office 2,838,474
Patented June 10, 1958

2,838,474

CONDENSATION PRODUCTS OF BISPHENOLS WITH AROMATIC VINYL COMPOUNDS

Helmut Meis and Hubert Sauer, Letmathe, Westphalia, Germany, assignors to Rutgerswerke-Aktiengesellschaft, Frankfurt, Germany No Drawing. Application January 28, 1954
Serial No. 406,903

8 Claims. (Cl. 260—62)

This invention relates to condensation products of bisphenols with aromatic vinyl compounds and to a method of producing condensation products of this type.

It has been found that condensation products of derivatives of bis-(4,4'-hydroxyphenyl-)methane with aromatic vinyl compounds are formed by heating said derivatives with aromatic vinyl compounds, said derivatives being used for condensation in dissolved or dispersed condition in the presence of surface-active inorganic materials, which are known in commerce under the name of "bleaching earths." Bleaching earths of natural origin, as well as those artificially produced, can be used in carrying out the present invention. The use of the bleaching earth in the condensation mixture in the range of 1.0–10.0%, based on the weight of the bisphenol compound, is preferred in carrying out the invention.

After condensation the bleaching earth catalyst is removed by filtration and the solvent used is then distilled off in order to recover the condensation product.

Condensation according to the present invention is carried out at relatively low temperatures, e. g. at 70°–90° C., at which very bright condensates are formed substantially without coloration, without the use of a protecting gas.

As derivatives or homologues of bis-(4,4'-hydroxyphenyl-)methane, bisphenols can be used which are obtained by condensation of a phenol, such as $C_6H_5OH$, or a suitable cresol, or dimethyl phenols or the like, with an aliphatic or aromatic ketone, in the presence of a catalyst and an acid condensing agent, such as hydrochloric acid, sulfuric acid and others. As examples of aromatic vinyl compounds, vinyl benzene, vinyl naphthalenes, vinyl carbazol, or derivatives of these compounds are mentioned, it being understood that individual vinyl compounds or mixtures of two or more of these compounds can be used in carrying out the invention. The proportions of vinyl compounds and bisphenols to be condensed can be varied within wide limits and depending on these proportions, highly viscous or solid resinous condensation products are obtained. For example 2–10 mols of the vinyl compound are condensed with 1 mol of the bisphenol compound. As solvents or diluting agents, aliphatic or aromatic hydrocarbons, such as benzene and xylene, or derivatives of such hydrocarbons, e. g. carbon tetrachloride can be used.

In general, the method of the invention is carried out in such manner that a suspension or solution of a bis-(4,4'-hydroxyphenyl) methane-derivative, e. g. a benzene solution of bis-(4,4'-hydroxyphenyl-)-propane is first heated in the presence of the catalyst under stirring to about 80° C. and the aromatic vinyl compound, e. g. styrene, is then caused to slowly flow into the suspension or solution. By regulating the rate of the vinyl compound introduced into the reaction mixture, the reaction temperature can be kept at the desired level.

According to another modification, a solution of both components can be mixed with the catalyst, whereupon the temperature is slowly raised under stirring to 70°–80° C. In this modification, it may become necessary to cool the reaction mixture during condensation, in order to prevent further increase of the condensation temperature. After the reaction is completed, the catalyst is separated by filtration and the solvent is distilled off, preferably under reduced pressure. During distillation in the range of 170° and 220° C., a small amount of a first distillate is collected and the desired condensation product is obtained as the residue.

As further examples of solvents or dispersing liquids, in which condensation is carried out, chloroform, tetrachlorethylene, dioxane and butyl acetate are mentioned. The borfluoride diacetic acid is used in the process of the invention as a reagent for non reacted vinyl compound.

*Example I*

288 g. of bis-(4,4'-hydroxyphenyl-) propane is suspended in 300 ccm. of xylene and the suspension is mixed with 25 g. of active bleaching earth known in commerce under the name "Bleichton G." To this mixture, the temperature of which has been raised to 80° C., 208 g. of styrene are added under stirring drop by drop within 30 minutes. Condensation is then continued at the same temperature under stirring for about 2 hours, until a sample shows no reaction any more with borfluoride diacetic acid. The liquid is then separated from the bleaching earth by filtration and the xylene is distilled off under reduced pressure. A first running distills over at 170–220° C. under a pressure of 10 mm. of mercury. The residue consists of 440 g. =88.5% of a bright resin which is liquid when warm and highly viscous when cold and is soluble in oil.

*Example II*

288 g. of bis-(4,4'-hydroxyphenyl-) propane, 208 g. of styrene and 236 g. of $\alpha$ methylstyrene are condensed with 25 g. of "Bleichton G" and processed, in the manner described in Example I, using 300 ccm. of xylene as diluting agent. Upon distillation 40 g. of first runnings are obtained at 170–220° C. under a pressure of 10 mm. of mercury, in addition to 580 g. =79% of a very bright oil-soluble resin, which is almost solid at room temperature, i. e. 18°–20° C.

*Example III*

144 g. of bis-(4,4'-hydroxyphenyl-) propane, 520 g. of styrene and 200 ccm. of xylene are heated under stirring to 80° C. and to this mixture 15 g. of "Bleichton G" are gradually added. After a reaction period of about 1 hour, the reaction mixture is processed in the manner described in Example I. 575 g. of a very bright, solid resin having a softening point of 44°–47° C., and being easily soluble in oils, are thus obtained.

As mentioned above, in carrying out the invention surface-active natural, as well as synthetic bleaching earths can be used. Examples of such bleaching earths are described, for example, in Oskar Kausch "Das Kieselsaeuregel und die Bleicherden" and Eckhart-Wirzmuller: "Die Bleicherden, ihre Gewinnung und Verwendung." The bleaching earth "Bleichton G" mentioned in the above examples, is a bleaching clay known under said name in commerce. It can be substituted by other surface-active bleaching earths in said examples.

It will be understood that the present invention is not limited to the specific materials, steps, proportions and other specific details described above and can be carried out with various modifications without departing from the scope of the invention as defined in the appended claims. As organic liquids, in the presence of which condensation is carried out, any aliphatic or organic liquid which is suitable for dissolving or dispersing the bisphenol, does not react with the compounds to be condensed and is not affected by heating to reaction temperature, can be used.

What is claimed is:

1. A process for preparing a condensation product, comprising heating one mol of a bisphenol formed by the condensation of a ketone with a phenol selected from the group consisting of phenol, cresols and dimethyl phenols, with 2-10 mols of an aromatic vinyl compound selected from the group consisting of styrene and lower alkyl-substituted styrenes, in the presence of an organic liquid which is inert to the bisphenol and to the vinyl compound, and in the presence of a surface active bleaching earth.

2. A process as claimed in claim 1, in which heating is carried out in the range of 70°–90° C.

3. A process as claimed in claim 1, in which condensation is carried out in the presence of a solvent for the bisphenol.

4. A process as claimed in claim 1, in which condensation is carried out in the presence of an organic liquid, in which the bisphenol is suspended.

5. A process as claimed in claim 1, in which the bleaching earth is used in an amount of 1–10%, based on the weight of the bisphenol.

6. A process as claimed in claim 1, in which the bleaching earth is separated from the condensation mixture by filtration and the organic liquid is separated from the filtered condensation mixture by distillation.

7. A process as claimed in claim 1, in which the organic liquid is selected from the group consisting of benzene, toluene and xylene.

8. A process as claimed in claim 1, in which the organic liquid is carbon tetrachloride.

References Cited in the file of this patent
UNITED STATES PATENTS

| | | |
|---|---|---|
| 2,224,837 | Rosenthal et al. | Dec. 10, 1940 |
| 2,596,235 | Geiger | May 13, 1952 |
| 2,636,905 | Kehe et al. | Apr. 28, 1953 |